July 20, 1965  L. D. BARLEY  3,195,384
CUTTING MACHINE HAVING MAGNETIC STORAGE
MEANS TO CONTROL WORK FEED MEANS
Filed Jan. 10, 1963  5 Sheets-Sheet 1
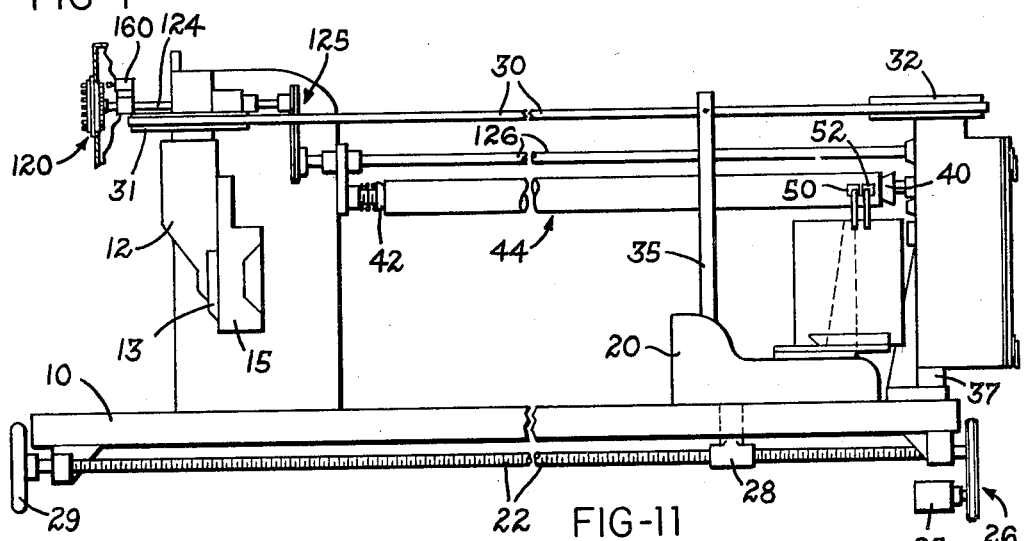
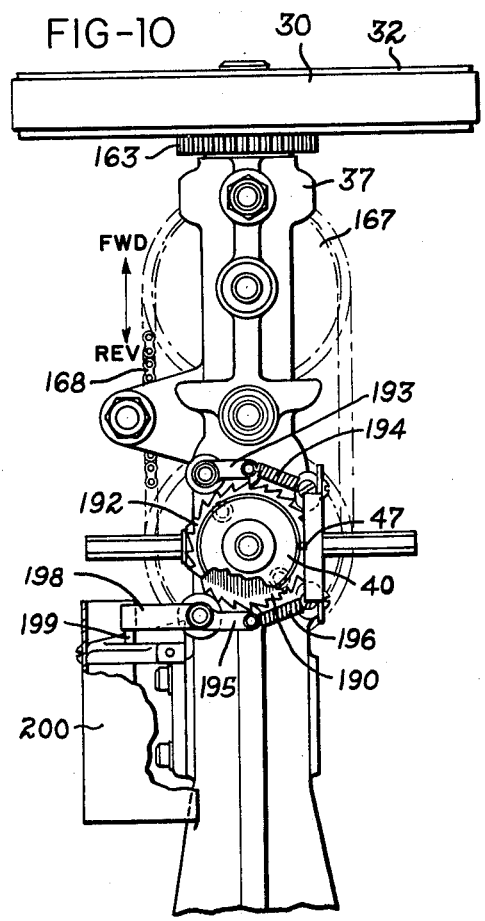
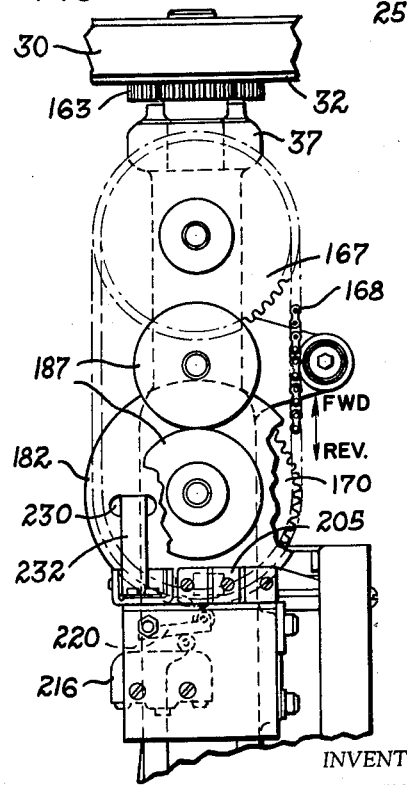
INVENTOR.
LEO D. BARLEY
BY
Marechal, Biebel, French & Bugg
ATTORNEYS

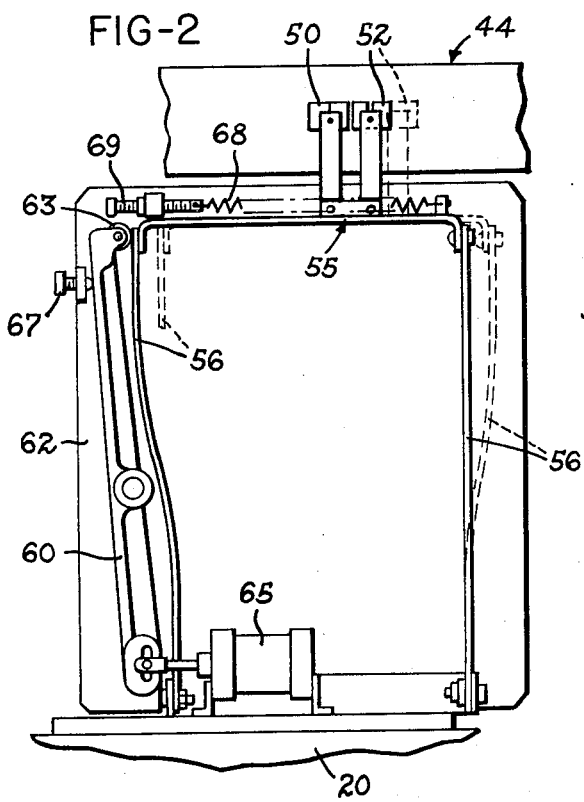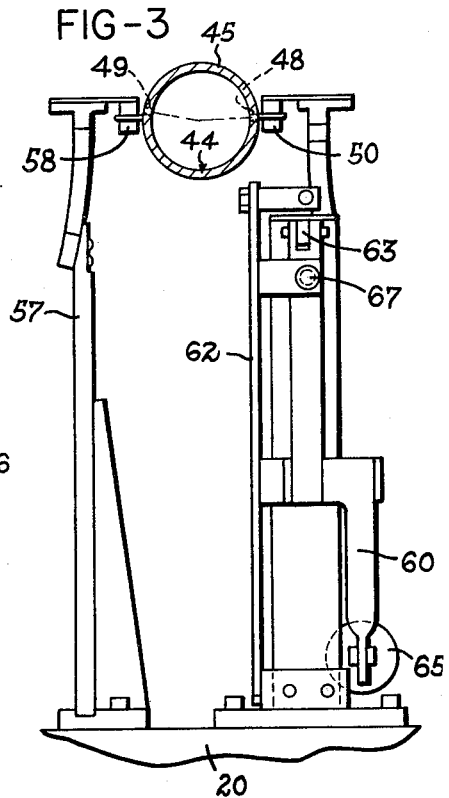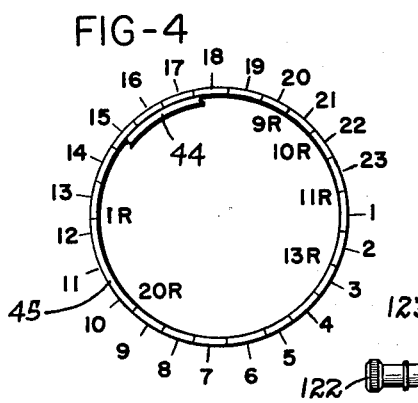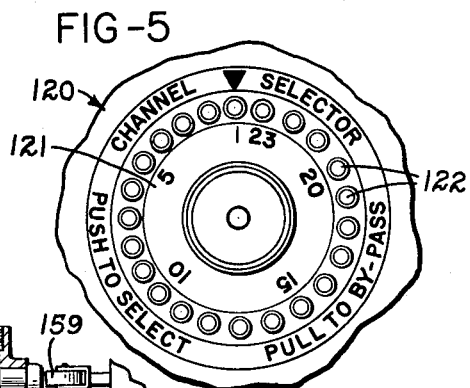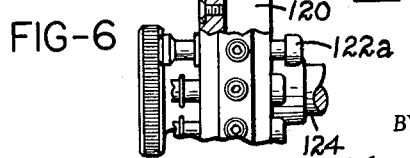
INVENTOR.
LEO D. BARLEY

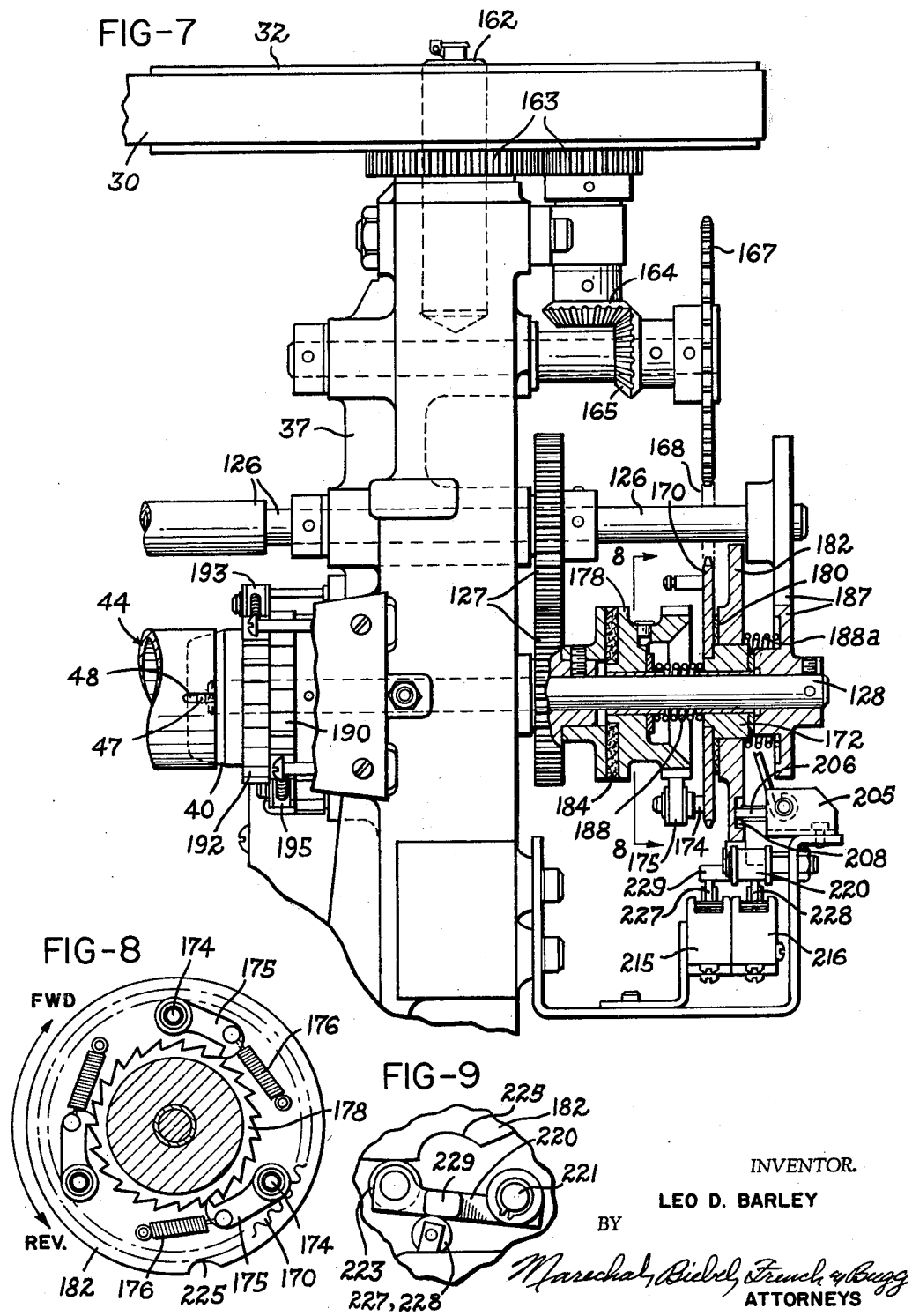

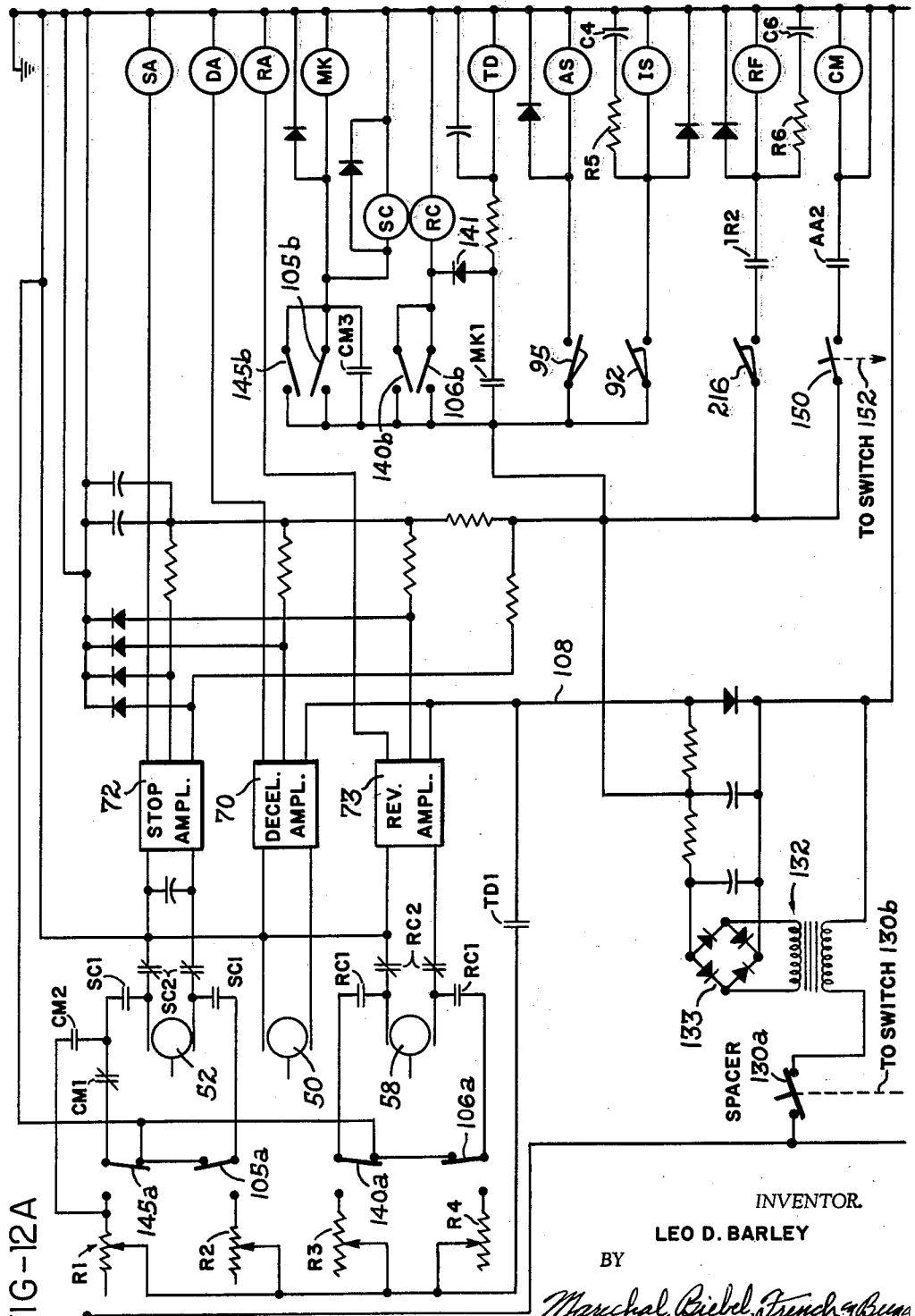

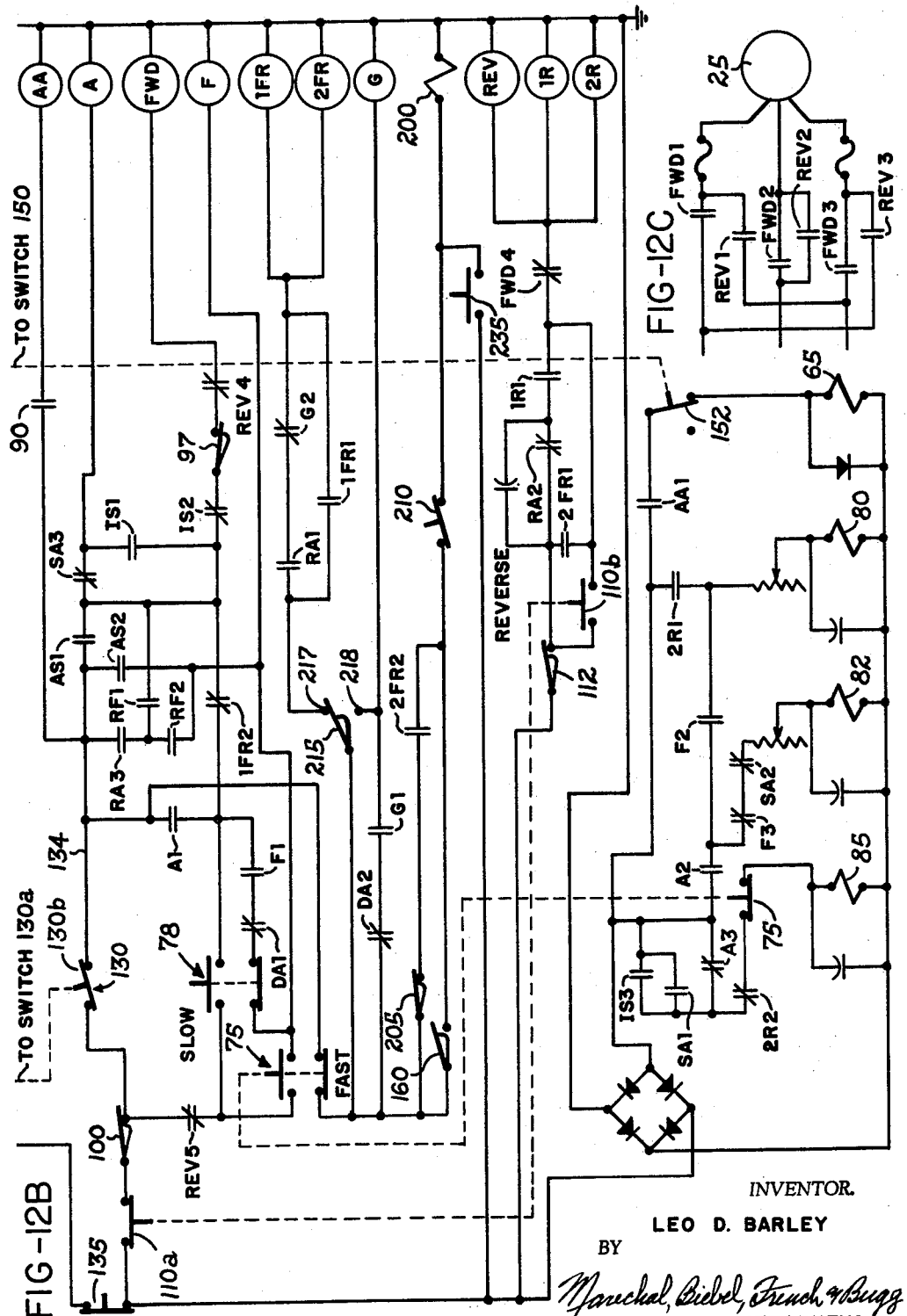

United States Patent Office 3,195,384
Patented July 20, 1965

3,195,384
CUTTING MACHINES HAVING MAGNETIC STORAGE MEANS TO CONTROL WORK FEED MEANS
Leo D. Barley, Dayton, Ohio, assignor to Harris-Intertype Corporation, Cleveland, Ohio, a corporation of Delaware
Filed Jan. 10, 1963, Ser. No. 250,678
5 Claims. (Cl. 83—71)

This invention relates to cutting machines, particularly for cutting stacks of sheet material such as paper, paperboard, cardboard, and the like, and particularly to a back gage control system for positioning the piles of material with respect to the cutting knife.

In these machines, the stacks of material to be cut are supported upon a work table, and a guillotine type knife is mounted above the table for movement toward the table in a cutting plane which intersects the table surface. Immediately adjacent the knife, and independently operable, there is a clamping member which can be moved under power against the stack to hold it stationary during the cutting stroke of the knife. The back gage is in the form of a pusher member which is mounted to move over the surface of the work table for pushing and positioning the stacks of material into and through the cutting plane, thus determining the position at which the stack comes to rest for making each desired cut. The present invention is concerned with such a back gage which is power operated, preferably by a reversible motor, and which is actuated automatically to move the stack forward in a predetermined sequence of movements to perform a series of cuts through the stacked material, this predetermined sequence being generally known in the art, and hereinafter designated, as a "program" or "job program."

The present invention is concerned with automatic control and positioning of the back gage, including provisions for switching from one job program to another automatically as the machine is operated, particularly after the back gage in its forward travel has completed one job program and is returning to a rearward position preparatory to starting a next program. In a particular embodiment of this invention the power for indexing the memory system from job program to another is derived from the back gage drive during reverse movement thereof as the back gage moves to a predetermined rearward position.

Accordingly, the primary object of this invention is to provide a novel control for the back gage of paper cutting machines, including in such control automatically operating mechanisms for changing from one job program to another.

Another object of the invention is to provide such a back gage control wherein the memory device, bearing information according to the job programs, is in the form of an elongated tube or its equivalent, having a surface which is selectively magnetizable and capable of storing magnetic pulse generating marks in a plurality of channels, and wherein such tube ore equivalent device can be shifted automatically with respect to the recording and returning heads to provide a predetermined sequence of job programs through which the back gage is guided automatically.

A further object of the invention is to provide an automatic control for the back gages of paper cutting machines wherein a memory system embodying magnetic pulse memory is provided, together with connected circuits, and is capable of reversing the back gage drive at variable predetermined forward positions, and which likewise is capable of reversing the back gage drive at various rearward positions, thereby minimizing the amount of overtravel required of the back gage at the end and at the beginning of each job program.

Other objects and advantages of the invention will be apparent from the following description, the accompanying drawings and the appended claims.

In the drawings—

FIG. 1 is a diagrammatic side elevational view showing the overall arrangement of a cutting machine embodying the present invention;

FIG. 2 is a side view on an enlarged scale showing the mounting construction for magnetic recording and reading heads, and their association with the memory device;

FIG. 3 is a view taken as seen from the left of FIG. 2 with the portion of the memory device shown in section;

FIG. 4 is a schematic sectional view, taken on an enlarged scale, through the memory device or tube;

FIG. 5 is a view on an enlarged scale showing details of the control dial for the memory device;

FIG. 6 is a detailed view, partly in section and partly in elevation, showing the construction of the selector pins in the dial and the detents therefor;

FIG. 7 is a detailed view on an enlarged scale, with the cover removed and with certain parts broken away and shown in section, illustrating details of the drive and associated controls for indexing the memory device with respect to different job programs;

FIG. 8 is a sectional view on an enlarged scale, taken on line 8—8 of FIG. 7;

FIG. 9 is a further enlarged view showing a detail of a switch control arm in the apparatus shown in FIG. 7;

FIG. 10 is a view, on a somewhat smaller scale, illustrating the apparatus shown in FIG. 7 as viewed from the left side thereof;

FIG. 11 is a view similar to FIG. 10, looking from the right side of FIG. 7; and FIGS. 12A, 12B and 12C are schematic electrical diagrams illustrating a typical control system according to the invention.

Referring to the drawings, and particularly to FIGS. 1-4, the cutting machine comprises a work table 10 above which is mounted a knife 12 which reciprocates in a generally vertical plane toward and away from the table to make the desired cuts. This knife includes a replaceable blade 13. Adjacent to the knife is the clamp member 15 which also moves toward and away from the table, independently of the knife, to clamp the stack or pile of material for cutting. Various power operated drives and controls for the knife and clamp are known to those skilled in the art, and since they form no specilc part of this invention, they are not illustrated. It should be understood, however, that the knife and clamp can be operated in any suitable manner, and with an interlock arrangement with the back gage control to prevent movement of the back gage when a clamping and/or cutting operation is under way, as will be described.

The back gage 20 is mounted to move over the surface of table 10, toward and away from the cutting plane of knife 12. Power for movement of the back gage is derived from lead screw 22 which is driven, in a preferred embodiment, by an electrical motor 25, through a suitable two speed transmission 26. This lead screw engages a nut 28 on the back gage. The lead screw may also be rotated manually by the hand wheel 29 which is fixed thereto and positioned at the forward edge of work table 10.

The position of the face or pushing area of back gage 20 is displayed accurately to the operator by means of a tape 30, preferably metallic, which is reeved about a front wheel or pulley 31 and a rear wheel 32. A mast 35 extends from the back gage member 20 upwardly adjacent to the tape, and is fastened thereto so that movement of the back gage will produce corresponding movement of the tape. The tape preferably is marked in convenient graduations of measurement which can be viewed with reference to an index mark at the front of the machine by the operator. The rear wheel 32 is mounted on a vertically extending post 37 at the rear of the work table, and this post provides support for a rear mounting jaw 40 which, together with a spring loaded forward jaw 42 (FIG. 1), forms a rotatable support for the program record or memory device, which is in the form of a tube 44 having a surface coating or covering 45 (FIG. 4) or material capable of retaining a magnetic pulse, for example by means of minute ferro-magnetic particles in the coating which will become and remain magnetized when exposed to an electrical field, and which can be "erased" by forming a uniformly magnetized path or channel along the material with an opposed field.

Actually, these pulses, in the form of discrete segments of the channels which are oppositely polarized from the rest of the channel, can be aptly described as "magnetic marks" which will produce a pulse of electricity in a reading head when there is relative movement between the magnetized or marked area and the head. It will be understood that magnetic "marks" may therefore be placed upon the memory device in a number of longitudinal paths, each path forming a program record, and, for purposes of illustration these have been marked on FIG. 4 as program channels 1 to 23. There are also intermediate channels for a separate recording and/or reading head, to be used in controlling the forward or reverse operation of the back gage motor 25, and these are appropriately marked 1R, 2R, etc. Because there are an odd number of channels, as in the illustrated example, the reverse channels can be diametrically opposed to the corresponding forward control channel, and cooperate therewith to form a job program.

Jaw 40 has a radially extending pin 47 which can engage with one or the other of the slots 48 and 49 (FIGS. 3 and 7) in the end of the tube 44. These slots are angularly arranged to position different portions of the coating on tube 44 under the magnetic heads. Thus, in the example using twenty-three job programs each comprising two channels, adjacent channels are spaced apart 8°, and to obtain the 4° offset between the slots, these slots are spaced apart 176° as shown by the dot-dash line in FIG. 3. Eventually there will be some abrasion of the record coating, and the operator can then switch the position of the tube, thereby prolonging its useful life.

In a preferred embodiment of the invention, the back gage motor 25 drives the two speed transmission 26, and is thus capable of advancing the back gage member 20 at a higher speed and moving it subsequently at a slower speed to its precise desired position. Such an arrangement is preferred since it overcomes the possibility that inertia of the back gage member after a relatively long and continuous forward motion may cause it to overshoot the desired position if stopped from the higher speed.

Accordingly, there is a circuit for changing the drive ratio of transmission 26 from fast to slow when the back gage is determined to be approaching a magnetic mark indicating a desired position. This circuit, which will be explained further on in detail, responds to a magnetic receiving head 50 (FIG. 2), while a separate magnetic receiving and/or recording head 52, spaced a predetermined distance behind the head 50, produces stop pulses to halt the back gage in the desired positions. These heads are mounted on a frame 55 which is in turn supported by a pair of spring arms 56, and they are anchored to the back gage member 20. During normal operation, the heads are in the position shown in full lines in FIG. 2, and they move forward in unison, along with the back gage member and thus scan the job program channel with which they are aligned. Similarly, on the opposite side of the tube 44, there is a mast or bracket 57 (FIG. 3) which extends upwardly and forms a mounting for a receiving and/or recording head 58 which scans, at the same time, the corresponding direction control channel.

The head 52 is also used for recording, by magnetizing portions of the material 45 in a particular selected program channel. This is accomplished by having the head 52 connected in one polarity for reading, and in an opposite polarity for recording, as will be explained. The head 58 performs the same dual function of recording and/or reading in the same general manner.

Because of the nature and function of the heads 50 and 52, they must be spaced apart a certain physical distance, and the machine may be called upon to perform certain trim cut operations which require a forward movement of the back gage member by a distance less than this spacing between these heads. Such slight movement should be accomplished at the slower drive speed. Therefore, in the event a so-called trim cut mark is located between the heads 50 and 52 when the back gage has halted with the head 52 opposite a mark, it is necessary to perform a scanning operation of the heads prior to resumption of back gage movement.

This scanning movement is provided by moving the heads 50 and 52 in a direction causing reverse relative movement between the heads and the program memory device with respect to their normal relative movement during forward motion of back gage member 20. This so-called "pre-scanning" movement is accomplished by shifting the frame 55, by reason of its flexible spring-like mountings 56. These form a parallelogram type of linkage which assures essentially straight line motion of the heads along the selected channel on which the device is operating.

A lever 60 is pivotally mounted on a bracket or plate 62 which extends upwardly from the back gage member. At its upper end the lever carries a roller 63, and at its lower end the lever carries a roller 63, and at its lower end the lever is connected through link 64 with a solenoid 65. An adjustable stop screw 67 normally engages the upper arm of lever 60, and the frame and spring mounting is held in contact with roller 63, and thus arm 60 is held in contact with screw 67, by a spring 68. This spring is anchored at one end to the frame 55 and at its other end to an adjustable tensioning screw 69 which is mounted on the plate 62. This screw forms a convenient adjustment of spring tension, and, of course, the solenoid 65 functions against this spring to move the heads through a scanning motion the limit of which is shown by the dotted line illustration in FIG. 2.

If the head 50 senses a mark during its scanning motion, as will be described, the back gage is caused to start at the slower speed. The heads are returned to their forward or at-rest position before the back gage member begins to move. This is accomplished by a momentary energization of solenoid 65, causing the scanning motion at the end of which the heads return to their normal position, as is later described in detail.

The circuit diagram, FIG. 12A, shows the heads 50, 52 and 58 schematically. The head 50 functions only as a reading head, and it will transmit an impulse, upon approaching a mark on the memory device through the decelerating amplifier 70 which will in turn energize the relay DA. Similarly, the head 52 will cause the stop amplifier 72 to transmit an operating pulse to the relay SA, and the head 58 will cause the reverse amplifier 73 to operate the direction control relay RA.

*Read and stop*

For purposes of explanation, it will be assumed that the back gage member 20 is at its farthest or full rear position from the knife, and that it is at rest. The operator initiates movement of the back gage by momentarily pressing the fast switch 75 to complete a circuit through relay F.

Contact F1 closes, energizing relay FWD, and energizing relay A through the normally closed contacts SA3. Relay A in turn completes a holding circuit for the relay F through the back contacts of the slow switch 78, via contacts A1. Thus, once the fast switch 75 is momentarily depressed, the relay F locks in.

Relay F also has a contact F2 (FIG. 12B) in the motor control circuit which will then complete a circuit through the fast or higher speed clutch 80, causing the back gage member to move forward at its higher speed. When the first mark, on that control channel aligned with the heads, is reached by the head 50, this will transmit a pulse through the amplifier 70 to cause the relay DA to be momentarily energized. This relay then opens its normally closed contacts DA1 in the holding circuit for relay F, and that relay drops out. At the same time, this will open the contacts F2 of relay F in the circuit of the fast clutch 80 (incorporated in transmission 26), and close the normally closed contacts F3 of this same relay in the circuit of the slow clutch 82 in the transmission. The back gage proceeds forward at its slower speed.

The head 52 is then approaching the same mark which caused the "slow down" pulse from head 50. When head 52 reaches this mark it transmits a pulse through amplifier 72 to momentarily energize relay SA. This relay opens its contact SA2 in the slow clutch circuit and closes its contact SA1 in the circuit of the brake coil 85, and a brake (not shown) is engaged to hold lead screw 22, stopping the back gage immediately. The normally closed contacts SA3 in the circuit of relay A are opened concurrently at this time, and that relay is deenergized to interrupt the power supply to the fast and slow clutches (only the latter was operative), and to seal in the brake circuit through the normally closed contacts A3 which are in parallel with the normally open contacts SA1.

Scan and continue

In normal operation, once the back gage is stopped the operator will actuate the usual controls to cause the clamp 15 to descend, followed by the knife 12 which will sever the pile at the designated place. Suitable interlock arrangements are provided, which per se form no part of the present invention, to assure that the back gage remains staionary during the clamping and cutting opeartion. A convenient such interlock may be provided by a solenoid (not shown) which has normally open contacts 90 in the energiizng circuit of the coil of relay AA. Thus, with such an arrangement this solenoid can be energized as the knife passes through its up stroke, the contacts 90 will be closed, and relay AA energized. This relay has a first set of normally open contacts AA1 in the energizing circuit of the pre-scanning solenoid 65 (see FIGS. 2 and 12B). When this solenoid begins to move its armature, it closes a switch 92 which in turn energizes the coil of the IS relay. This relay has normally open contacts IS1 which then close and normally closed contacts IS2 which open, in the circuit of the relay FWD. Also, contacts IS3 in the circuit of brake coil 85 are also closed to hold the brake on during the scanning operation.

When the armature of the pre-scan solenoid 65 is moved to its full extent, this causes closing of switch 95 which in turn energizes the coil of the AS relay. Thus, the contacts AS1 are closed and complete a circuit through the normally closed contacts SA3 to the coil of relay A. This relay is locked in through its contacts A1 and the normally closed SA3 contacts. The contacts AS2 of the AS relay also are closed when it is energized, and complete a circuit through the coil of the F relay which also locks in through the contacts F1 and A1 and the back contacts of the slow switch 78. In the lower portion of FIG. 12B, contacts A2 and F2 close, completing the circuit through the fast or higher speed clutch coil 80.

When the relay contacts 90 are opened, as the knife comes to a stop at its raised position, relay AA is deenergized, and its contacts AA1 open to deenergize the pre-scanning solenoid 65. As this solenoid releases its armature, the switch 95 is opened, to deenergize the AS relay, and as the armature reaches its terminal deenergized position switch 92 opens to deenergize the IS relay. This in turn causes the contacts IS2 to return to their normal closed condition and, so long as the clamp is raised permitting the clamp interlock switch 97 to close, then the relay FWD will be energized, closing its contacts FWD1, 2 and 3 in the directional control circuit of the back gage motor 25 (FIG. 12C). The back gage will thus proceed forward at its higher speed.

Slow start forward

If during the scanning movement the pickup head 50 crosses a mark on the program channel which rests between the heads 50 and 52 as they stopped, it will send a pulse through the decelerating amplifier 70 to energize the DA relay. It should be recalled that when the head 50 first sensed a stop mark it caused the transmission to shift to the slower speed, and also transferred control from itself to the stop head 52. If there is a mark denoting a trim cut which immediately follows the first mark, at a spacing closer than the physical spacing between the heads 50 and 52, then the head 50 has passed over this second or trim cut mark without effect on the circuit, by the time the back gage is stopped. Thus, the purpose of the scanning operation is to determine whether such a trim cut mark is then located between the heads.

Assuming that there is a trim cut signal mark, when relay DA is energized this will open the normally closed contacts DA1 in the holding circuit of relay F, causing it to be deenergized and thereby opening the contact F2 in the circuit of fast clutch 80. At the same time, normally closed contact F3 will close to complete a circuit through the slow clutch coil 82, and the back gage will move forward at its slower speed.

It should be noted that when the head 52 passes over a pulse during the scanning operation, the resultant pulse through amplifier 72 will energize relay SA, causing the normally closed contacts SA3 to open momentarily. Therefore, to insure that relay A is kept energized, relay IS must be held energized, to keep contacts IS1 closed, until relay SA returns to normal, and contacts SA3 are again closed. This is accomplished by the condenser C4 which is charged through resistor R5 while the switch 92 is closed. When this switch opens, C4 discharges through the coil of relay IS for the overlap interval required.

The actual scanning operation occurs when the heads 50 and 52 move back to their normal positions, i.e., from the dotted toward the full line position as shown in FIG. 2.

Erasing and marking

The functions of erasing programs no longer needed from the channels on which they are recorded is somewhat related to the function of recording new programs on the "empty" channels. Therefore, these functions will be described concurrently. To erase, the back gage is brought to its forwardmost position, for example by holding closed the fast switch 75, at which time the back gage will proceed forward until it opens the forward limit switch 100. Then, referring to FIG. 12A, the erase switches are closed manually. These switches each include contacts in several different circuits which are actually operated in unison. They are, therefore, designated as switch 105a, shown in the read position, and switch 105b in the circuit of the MK and SC relays, shown open. Switch 106b is in the circuit of the RC relay, also shown open, and switch 106a in the circuit of the reversing control head 58.

With the erase switches actuated, relays MK, SC and RC are all energized. With respect to the stop head 52, the normally open contacts SC1 are closed, and the normally closed contacts SC2 are opened. Since only the switch 105a has been actuated, a circuit is completed from the −24 volt D.C. supply line 108, through the adjusting potentiometer R2 and through head 52 to ground via the now closed contacts SC1. This circuit is completed at the contacts TD1 since the TD relay is energized by closing of contacts MK1 when the switch contacts 105b were closed to energize MK. At the same time, a circuit is completed through 106a and the now closed contacts RC1, through head 58 to ground. The normally closed RC2 contacts are, of course, open since relay RC is energized, with switch 106b closed. The potentiometer R4 provides a trim adjustment for this energizing circuit.

The operator then can cause the back gage to proceed to its rearmost position by pressing the reverse switch, which opens the reverse switch contacts 110a and closes the reverse switch contacts 110b. This causes the reverse relay (REV) to be energized, as well as the 1R and 2R relays. Relay REV will thus close its contacts REV1, 2 and 3 in the circuit of motor 25 (FIG. 12C) and relay 1R will close its contacts 1R1 which form a holding circuit for these three relays through the rear limit switch 112. When the back gage reaches its rearmost position this switch will open, deenergizing these relays, and causing the back gage motor to stop. The rearward movement proceeds at high speed, since contacts 2R1 of the relay 2R are closed completing a circuit through the fast speed clutch 80, while the normally closed contacts 2R2 are opened in the circuit of brake coil 85, to prevent energizing of the brake. These contacts, of course, revert to normal when the rear limit switch 112 opens and the relays REV, 1R and 2R are all deenergized.

To "mark" on the magnetic memory system, the desired channel is selected, and this may be done by rotating the scribed head 120 (FIGS. 1 and 5). This head has a dial 121 on the front marked with the appropriate positions for the number of channels available, and there is a manually movable pin 122 at each position which can be moved to one of two positions, as determined by the detent device indicated generally at 123. The head 120 is fixed to a shaft 124 which is in turn connected, for example by the chain and sprocket drive 125 shown schematically in FIG. 1, to a countershaft 126 which extends over the memory tube 44 and is journaled in the rear post 37. Gears 127 (FIG. 7) provide a drive connection from the counter shaft 126 to a stub shaft 128 on which the rear mounting jaw 40 is carried, and therefore the tube with its magnetizable surface 45 can rotate in unison with the dial 121.

To record a program, the operator must first be sure that the manually operable spacer control switch 130 is closed. This switch has a first contact 130a (FIG. 12A) which completes a power circuit to the transformer 132 which in turn supplies power to the full wave diode rectifier 133. The other contact 130b (FIG. 12B) of the spacer switch is in a series circuit with the forward limit switch 100 and the reverse switch 110a, and if these are closed it will complete a circuit to line 134 which provides power for energizing the relays A, AA, and FWD, and in some cases relay F, provided the other contacts are appropriately closed.

The back gage can be moved forward at this time by manual closing of either the fast switch 75 or the slow switch 78, preferably the latter, and, as previously described, this will complete circuits through the forward relay FWD to energize the motor 25 and an appropriate one of the clutch coils 80 or 82. The back gage is stopped at the desired position by manual operation of stop switch 135 (FIG. 12B) which will cut the power to the relays, and thereby cause both transmission control coils 80 and 82 to be deenergized, and will cause the brake coil 85 to be energized.

It will be assumed that the back gage has now been located at the rearward position to which it must go before starting forward on the job program to be recorded, by adjustment of the hand wheel if needed. This position, may be somewhat forward of the rearmost position attainable by the back gage. The operator can now record a reverse mark on the reverse channel aligned with head 58 by closing switch 140a and switch 140b. Switch 140b energizes the RC relay, whose normally closed contacts RC2 will open to disconnect head 58 from amplifier 73 while the RC1 contacts will close completing a circuit from line 108 through contacts TD1 (the TD relay is energized along with the RC relay, through the diode 141) and through the trimming potentiometer R3 to ground. Thus, a D.C. current of reversed direction from that used for erasing is applied through the head 58, and this will in effect create a "mark" on the channel opposite in polarity to the entire remainder of that channel, as is well known in the art of magnetic recording and erasing.

To locate the various stop marks on the forward control channel the operator then causes the back gage to move forward, by appropriate operation of switches and possibly of hand wheel 29, as previously described, and while viewing the tape 30 to ascertain when the back gage reaches the desired position for each cut. To record a mark on the control channel at these positions, the operator closes switches 145a and 145b. Switch 145b will complete energizing circuits through the relays MK and SC, and due to closing of contacts MK1, through the relay TD. This results in completion of a D.C. circuit from line 108 through TD1, through the trimming potentiometer R1, through switch 145a and the now closed contacts SC1 through head 52 to ground. Again, this D.C. current is in reverse direction to that used for erasing, and thus places a "magnetic" mark on the channel. The contacts SC2 are, of course, open at this time, disconnecting head 52 from amplifier 72.

After the last or forwardmost mark, the operator may place a mark in the corresponding reverse channel which will cause the back gage motor to reverse and will return the back gage to the position located by the previous mark at the rear of the reverse channel, or it is possible to permit the back gage merely to come to its forward limit switch 100. If a reverse mark is used, then the back gage will automatically return itself to the beginning of the same or a different job control program, as will be described.

The machine also includes a feature which permits operating the back gage manually through the first sequence or program of a particular job, and simultaneously making the record of the job program. Details of this arrangement are not a part of this invention, but are described in the copending application Serial No. 145,914, filed October 18, 1961 entitled Automatic Memory Storage Operations of a Cutting Machine, assigned to the same assignee as this application, and accordingly this feature is described herein only in sufficient detail to identify the portions of the circuit which pertain to it.

To accomplish this function the operator closes switch 150, and when the knife is operated, during the time when contacts 90 are momentarily closed, relay AA will be energized to close the contacts AA2. Switch 150 is mechanically connected to switch 152 so that the latter will open when switch 150 is closed, thereby opening the circuit to the scanning solenoid 65. When the knife is actuated, the contacts 90 will close to energize relay AA and this in turn will complete a circuit to energize relay CM.

At the same time, switches 145a and 145b will remain in the "read" position, as shown. Since relay CM is energized contacts CM1 will open and contacts CM2 will close, bypassing switch 145a and completing a circuit through the closed contacts SC1 to ground, and CM3 will close, bypassing switch 145b, energizing MK, SC and TD, thus momentarily placing an energizing potential on head 52. Therefore, each time the knife is operated with the circuit in this condition, the contacts 90 are closed and this results in placement of a mark on the channel of the memory device which is at that time aligned with the head 52 (now recording). This sequence can be repeated for all desired positions of that particular job.

Job program selector

The present invention provides for automatic selection of any predetermined sequence of job programs stored on the memory device. As already explained, the head 120 carries movable pins 122 at each position corresponding to a channel on the memory device 44 where a job program may be recorded. Each of the pins can be displaced manually to occupy one of two positions, as shown in FIG. 6. Any pin that is displaced inwardly of head 120, for example to the position indicated by the pin 122a, will be able to operate the actuator roller 159 of a switch 160 which is mounted directly behind the head. Therefore, the operator can select a desired sequence of one or more of the channels 1 through 20 by depressing the appropriate pins 122, and as will be explained, the memory tube and the head 120 connected thereto will be rotated automatically to the next program during the time when the back gage travels toward its rearwardmost position at the completion of the previous job.

The mechanical power for this operation is derived from the tape 30 which rotates the rear pulley 32 as the back gage moves. As shown in FIG. 7, this pulley is fixed to a stub shaft 162 which is mounted in the top of the post 37. Transfer gears 163 derive power from the shaft 162 and rotate a bevel pinion 164 which in turn drives a bevel gear 165, also mounted on the post 37. Gear 165 is in turn connected to rotate a drive sprocket 167 and this sprocket is connected through chain 168 to a lower driven sprocket 170, carried on a sleeve 172 which is free to rotate on the shaft 128.

The sprocket 170 carries a plurality of pins 174, on each of which there is a pivotally mounted pawl 175, as shown in FIG. 8. Each pawl is provided with a corresponding spring 176 which tends to engage the pawl with a ratchet member 178, such member being free to rotate about the shaft 128. Accordingly, power is transferred from sprocket 170 to the ratchet member 178 only in one direction, namely when the sprocket 170 is rotated during backward travel of the back gage. When the back gage moves forward, the pawls ride over the ratchet member.

The sprocket 170 has a friction drive connection through a pad or ring 180, to a control cam 182 which is free to rotate on the sleeve member 172. Similarly, the ratchet member 178 has a friction drive connection through a ring of suitable friction material 184 to the lowermost of the gears 127, i.e., that gear which is connected to rotate the shaft 128. In effect, the sprocket 170 therefore has slip clutch drive connections to both the cam 182 and to the shaft 128, but these connections are separate and distinct. In order to maintain the parts in alignment, the outboard ends of the shafts 126 and 128 are provided with contacting bearing wheels 187 which function merely to keep the parts aligned. A spring 188 preferably is mounted around shaft 128 between the sleeve 172 and the ratchet member 178, providing pressure for drive contact in each of the slip clutches.

The shaft 128 also carries a pair of ratchet wheels 190 and 192, which are shown partly in FIGS. 7 and 10. These ratchet wheels are suitably fastened to shaft 128 immediately behind the jaw 40. A pawl 193 is rotatably mounted on the post 37, and urged by spring 194 into engagement with the ratchet wheel 192. The direction of teeth on this wheel, and the mounting of pawl 193, are such that any rotation of shaft 128 during forward movement of the back gage is prevented. This is merely to assure that the memory tube 44 is held stationary at this time, in case there should be a momentary transmission of driving force through the ratchet member 178. During rearward movement of the back gage, when shaft 128 may be rotated to provide indexing movement, pawl 193 rides over the teeth of ratchet wheel 192.

The teeth of ratchet wheel 190 are arranged opposite to the ratchet wheel 192. A pawl 195 is pulled into engagement with ratchet wheel 190 by a spring 196, and this pawl includes an outwardly extending lever arm 198 which engages the output pin 199 of a solenoid 200. During an indexing operation, if it is desired to change to the next job program, solenoid 200 is energized to release pawl 195 from ratchet wheel 190.

The cam 182 controls the operation of a number of switches, as will be explained, which in turn control the circuits for advancing or indexing the magnetic record tube to the next selected position, as represented by the next depressed button or pin 122 in the direction of rotation of the channel selector head 120. One of these switches is a normally closed switch 205 (FIG. 7) which is provided with an operating roller follower 206 normally resting in a depression or cavity 208 in the cam 182. When the cam is moved during an indexing or job selecting operation, as soon as the cam rotates by an amount equivalent to the angular distance between the pins 122, the roller 206 will be moved as the cavity 208 turns away from it, and switch 205 will be opened. Referring to the wiring diagram, FIG. 12B, switch 205 is shown in its normally closed position. It is in a series circuit with contacts 2FR2 of relay 2FR, and this circuit in turn is connected through a manually operable index switch 210 (shown closed) to control the supply of power to the index solenoid 200.

Program selector controls

In connection with the controls for operating the program selector mechanism, it should be noted first that there are circuits provided for automatically reversing the direction of movement of the back gage, as follows. Assuming that the last or forwardmost signal in a control program has been passed, relays A, FWD and F will be energized. The pickup head 58, upon sensing a mark on the direction control channel, will send a pulse through amplifier 73 which energizes relay RA. This closes contacts RA1, energizing relays 1FR and 2FR. Then, contacts 1FR1 close to form a holding circuit and contacts 1FR2 open to break the holding circuits for relays A, FWD and F. Contacts 2FR1 close to energize relays REV, 1R and 2R, and contacts 2FR2 close in the control circuit of solenoid 200. After a momentary overrun, the back gage will reverse, due to the opening of the contacts FWD1, 2 and 3 and closing of contacts REV1, 2 and 3. The head 58 will again pulse the RA relay, as this head comes back across the same mark on the direction control channel which initiated this sequence, but the circuits are not affected as relay 2FR continues to hold relays REV, 1R and 2R energized.

As previously mentioned, contacts 2FR2 close as the circuits are set up which reverse the movement of the back gage. At this time, switch 205 is also closed and as a result solenoid 200 will be energized if the index switch 210 has been closed by the operator, when he wishes the apparatus to index automatically. When solenoid 200 is energized, it withdraws the pawl 195, the ratchet wheel 190 is released and a drive connection is completed from the sprocket 170 through the ratchet member 178 (since the sprocket is now rotating in a reverse direction) and through the friction drive connection to the gear 127 and the shaft 128. Immediately upon initiation of the reverse direction movement of sprocket 170, it tends to rotate cam 182 through its friction drive connection directly to this sprocket, and as a result switch 205 opens. This breaks the circuit to solenoid 200 through the contacts 2FR2 if the mechanism rotates any farther than the angular spacing between successive pins 122. However, in the meantime the index head 120 has been rotated such that the depressed pin 122a which was holding open switch 160 no longer engages the roller 159. Consequently, a shunting circuit is completed through switch 160 to the index switch 210, and relay 200 will remain energized if the next selected channel is more than one past the channel where the indexing motion began, until switch 160 is opened by the next depressed pin 122.

As mentioned above, switch 205 is opened after a relatively slight rotary movement of the indexing mechanism, equal to the spacing between successive selector pins 122. Therefore, the ultimate deenergizing of solenoid 200 when a channel is to be skipped, and the resultant reengagement of pawl 195 with ratchet wheel 190, depends upon the opening of switch 160 when the next selected channel is presented to the reading and recording heads.

Switches 215 (FIGS. 7 and 12B) and 216 (FIGS. 7 and 12A) are also operated in response to movement of cam 182. Switch 215 is a double pole switch which in its normal condition completes a circuit through its contact 217 to the control circuits for the relay coils 1FR and 2FR. When switch 215 is operated it shifts to its contacts 218 which supplies power to a coil of a relay G. Switch 216 is in the D.C. control circuit, and controls power to the coil of relay RF. This switch is normally open, and closes when the switch 215 shifts.

In order to operate these switches simultaneously, a follower arm 220 (FIG. 9) is pivotally mounted on a stud 221, and provided with a roller 223 which follows the edge of cam 182. When the cam rotates during operation of the indexing mechanism, it completes approximately 348° of movement before a notch 225 in the edge of cam receives roller 223. At this time, due to the urging of the internal springs (not shown) in the switches, the roller 223 will drop into notch 225. Both switches 215 and 216 have their operating rollers 227 and 228 pressing against a cross arm 229 which is an integral part of the operating arm 220. Thus, both switches are operated simultaneously when roller 223 drops into the notch 225.

Therefore, once the cam 182 has made slightly less than a complete revolution, enough to move all channels on the magnetic record member 45 past the pickup heads, switches 215 and 216 will be actuated. This breaks the circuit of relays 1FR and 2FR and energizes relay G, which seals in through contacts G1, holding this condition until the end of reverse travel of the back gage. Simultaneously, switch 216 energizes relay RF, since contacts 1R2 are closed. This also completes a circuit through resistor R6 and condenser C6. Contacts RF1 and RF2, in the circuit of the FWD relay (FIG. 12B) are closed at this time.

When the direction control pickup head 58 reaches a mark signifying the rearward end of travel desired for the back gage in the new channel which has just been presented to this pickup head, it pulses the RA relay, and this opens contacts RA2 and closes contacts RA1 and RA3. When RA2 opens this breaks the circuit holding the relays REV, 1R and 2R, and contacts RA1 and RA3 close. Contact RA3 completes an energizing circuit to relays A, FWD and F, through the already closed contacts RF1 and RF2. When relay 1R is deenergized it opens its contacts 1R2 in the circuit of the RF relay, but condenser C6 discharges through resistor R6 and through the coil of the RF relay, holding it until relay A is energized to seal in the FWD circuits.

After a slight overrun the back gage will start forward at fast speed, the cam 182 will move in the opposite direction to open switch 216 and shift switch 215 to its contacts 217, and the head 58 will pass the same mark going forward. This causes another pulse to the RA relay, but its contacts cause no change in the circuits since relay G is still held energized to prevent a false action of 1FR and 2FR. However, the first time the back gage stops at a mark in the new control program which has been presented to the heads 50 and 52, the circuit to relay G is broken because relay DA is energized, and its normally closed contacts DA2 open. It should be noted that the cam 182 will continue to rotate until the slot or cavity 230 (FIG. 11) in its surface is engaged by a leaf spring arm 232 which is mounted on the bracket supporting switches 215 and 216. This arm will stop the rotation of the cam 182, with the notch 225 having moved around to the other side of the roller follower 223, as illustrated in FIG. 11. From then on, the friction drive connection between cam 182 and sprocket 170 will slip until a further indexing operation is initiated.

There is a further manually operated switch 235 (FIG. 12B) which is normally open, and which is connected in a bypass circuit around the switch 210 such that when switch 235 is closed the index solenoid 200 will be energized. The operator can close switch 235 manually, when he desires to move the program selector head 120 manually, and this will cause the pawl 195 to be released from ratchet wheel 190, permitting the operator to change program channels manually.

Accordingly, with the present control, the operator of the cutting machine can record a number of different control programs in different channels on the record member. It should be noted that each control program includes not only the record marks which determine the successive stop positions of the back gage as it moves forward in a program, but also a direction control channel, cooperating with the reading/recording head 58 to determine the extent of forward movement of the back gage at the end of the program, and the ultimate rearward position which the back gage must reach before it can come forward to follow that program.

Therefore, when the back gage completes one program, if the index switch 210 is closed by the operator to provide for automatic job program indexing, the back gage will move forward far enough to clear the pile for removal or manual repositioning at the end of a program, and then the indexing mechanisms and controls will be actuated immediately after the back gage reverses and will advance the memory device to the next selected channel. By the time the back gage has moved through any significant rearward motion, the direction control channel for the next or succeeding program control will be aligned with the reading head 58, and the magnetic mark therein will determine the position at which the rearward motion of the back gage ceases, and it is caused to move forward and begin the new program. In this manner, the operator can predetermine the amount of motion required of the back gage in excess of the actual stop positions in a job program, and he can arrange the direction control marks to minimize the amount of and time required for such excess motion.

Of course, the operator can at the same time select any one of the multiple job programs by depressing appropriate pins 122, and thus the indexing mechanism can be caused to skip certain channels if desired, or operate in any desired sequence so long as it continues to index from the number 1 channel upward toward the highest channel. The indexing mechanism can revolve continuously, and thus it is possible to index, for example, from channel number 4 around to channel number 2, passing over all higher channels between number 4 and its maximum capacity before returning to pass over the number 1 and stop in the number 2 channel.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. In a paper cutter having a power operated knife, a back gage movable toward and away from said knife to position a pile for cutting, and reversible drive means for said back gage including a back gage drive control for effecting controlled movement thereof; the combination of a memory device having a plurality of channels each capable of storing a plurality of reference marks indicating desired positions of said back gage, reading means for reading the reference marks, control circuitry governed by said reading means and connected to actuate said back gage control, means causing relative movement between said memory device and said reading means in correlation to back gage movement for reading said memory device with reference to the position of said back gage, means arranged to present said reading means to selected ones of said channels, and indexing means operative in response to reverse movement of said back gage away from said knife to shift the relation of said reading means and said memory device during motion of said back gage away from said knife to present different channels to said reading means.

2. In a paper cutter having a power operated knife with a control selectively operable to cause a cutting stroke of said knife, a back gage movable toward and away from said knife to position a pile for cutting, and reversible drive means for said back gage including a back gage drive control for effecting controlled movement thereof; the improvement comprising a memory device extending along the path of movement of said back gage and having a plurality of channels each capable of storing a plurality of magnetically created marks indicating successive desired positions of said back gage constituting a control program, a recording/reading head movable with said back gage along a selected one of said channels of said memory device, a marking circuit connected to said head for forming control marks in said memory device, a reading circuit connected to said head to read said control marks, control circuitry governed by said reading circuit and connected to actuate said back gage control, indexing means connected to shift said memory device with respect to said head to present a different channel to said head, and index controls automatically operative on said indexing means during movement of said back gage away from said knife to present preselected ones of said channels in a predetermined sequence to said head.

3. In a machine for cutting piles of sheet material and the like including a back gage with a controlled reversible power drive, the combination of a program control storage member having multiple storage channels in which a plurality of magnetic control marks can be recorded to represent successive positions of said back gage in performing programs of cutting operations and to represent the forward and rearward limits of movement of the back gage required to complete a program and return to a starting position, a direction control reading head arranged to detect those control marks representing limits of movement, means movable with said back gage and connected to cause reading movement between said head and a selected channel on said storage member, control circuits connected to control reversing of said power drive and receiving signals from said reading head for reversing the motion of said back gage according to the program marks on the channels, indexing means for automatically shifting the relative positions of said head and said storage member immediately upon reversal of movement of said back gage at a forward limit mark for causing scanning of different ones of said channels in predetermined sequence, and an adjustable program selector controlling said indexing means to determine which channels are scanned in sequence.

4. In a paper cutter having a power operated knife with a control selectively operable to cause a cutting stroke of said knife, a back gage movable toward and away from said knife to position a pile for cutting, and drive means for said back gage including a drive control for governing the movement of said back gage; the improvement comprising an elongated tubular member having a coating of magnetizable material on its outer surface to form a memory device having a plurality of magnetically created marks identifying successive desired positions of said back gage, means mounting said tube extending along the path of movement of said back gage and providing for rotation of said tube to locate different channels thereof in an operative position, a recording-reading head movable with said back gage and mounted to pass along that channel on said tube which is in operative position, a reading circuit connected to said head for transmitting control signals in response to sensing of marks on the operative channel by said head, control circuitry governed by said reading circuit and connected to actuate said back gage control, indexing means connected to present different preselected channels in the operative position, index controls operative on said indexing means to cause functioning thereof to change the position of said tube to present certain ones of said channels in the operative position, and a control circuit incorporated in said index controls including parallel connected switches one of which can function to produce indexing movement of the tube to present the next adjacent channel into the operative position and the other of which can operate to produce a greater indexing movement to present a channel farther removed than the next adjacent one into the operative position.

5. In a machine for cutting piles of sheet material and the like including a back gage with a controlled power drive, the combination of a tubular program control storage member having a continuous magnetic recording surface providing multiple storage channels lengthwise thereof spaced from each other by a common dimension and in which a plurality of magnetic control marks can be recorded to represent successive positions of said back gage in performing programs of cutting operations, means supporting said storage member extending along the path of movement of said back gage, a reading head arranged to detect the control marks in a selected one of said channels, support means for said head movable with said back gage to cause reading movement of said head along a selected channel on said storage member, indexing means for automatically rotating said storage member with respect to said head for causing scanning of different ones of said channels in predetermined sequence, an adjustable program selector controlling said indexing means to determine which channels are scanned in sequence, control circuits connected to control starting and stopping of said power drive and to receive stopping signals from said reading head for positioning of said back gage according to the program marks on the channels, and means for adjusting the connection between said tubular member and said supporting means to shift the relation therebetween to bring the areas of said recording surface between adjacent channels into operative position for functioning in place of the channels used previously to such shifting.

References Cited by the Examiner

UNITED STATES PATENTS

| | | | |
|---|---|---|---|
| 2,475,245 | 7/49 | Leaver et al. | 318—162 |
| 2,710,934 | 6/55 | Senn | 318—162 |
| 2,737,158 | 3/56 | Seybold et al. | 83—365 X |
| 2,916,801 | 12/59 | Lyttle | 83—71 X |
| 2,994,000 | 7/61 | Schoppelrey | 83—71 X |
| 3,012,453 | 12/61 | Mottu et al. | 318—162 X |
| 3,031,054 | 4/62 | Thumin | 83—467 X |
| 3,118,334 | 1/64 | Blaha | 83—71 |

ANDREW R. JUHASZ, *Primary Examiner.*